3,396,142
METHOD FOR MAKING GLASS FIBER REINFORCED THERMOPLASTIC POLYMER ARTICLES
Arthur George Little, Auburn, and Allan D. Martin, Sanford, Mich., assignors to The Dow Chemical Company, Midland, Mich., a corporation of Delaware
No Drawing. Filed Apr. 24, 1963, Ser. No. 275,223
6 Claims. (Cl. 260—41)

This invention relates to the preparation of glass fiber reinforced thermoplastic polymer articles. It pertains especially to an improved process for making shaped articles of glass fiber reinforced thermoplastic polymers by an injection molding technique.

It is known to prepare laminates and compositions containing glass fiber reinforcing material embedded in or laminated with a resinous material.

In preparing fiberglass reinforced thermoplastic polymer articles by injection molding it is common practice to compound the heat-plastified polymer with the glass fiber to intimately mix and coat or encase the glass fibers in the plastic polymer. The product containing the encapsulated glass fibers or chopped strands, uniformly or substantially uniformly distributed throughout, is cooled and ground or cut to a granular form suitable for molding, and can readily be shaped by injection molding techniques to form articles of uniform and a desired quality.

We have now discovered that uniform desirable glass fiber reinforced thermoplastic polymer articles can readily be prepared by injection molding operations by blending together a normally solid thermoplastic polymer in the form of particles of sizes not greater than about 12 mesh per inch as determined by U.S. Standard screens and a reinforcing amount of chopped strand glass fibers of lengths between about 3/16 and 9/16 inch, preferably chopped strand glass fibers of about 1/4 inch length, in proportions of from about 60 to 95 percent by weight of the thermoplastic polymer and correspondingly from about 40 to 5 percent by weight of the chopped strand glass fibers, to obtain a uniform or substantially uniform dry mixture of the materials and thereafter feeding, or using the mixture as the feed, in an injection molding process, advantageously to a standard extruding injection molding machine, and making shaped articles of the fiberglass reinforced thermoplastic polymer by the injection molding process.

Thermoplastic ploymers that can be employed in the process are the normally solid homopolymers and copolymers of one or more monovinyl aromatic compounds having the general formula Ar—CH=CH$_2$ wherein Ar is an aromatic hydrocarbon or a halohydrocarbon of the benzene series such as styrene, vinyltoluene, vinylxylene, chlorostyrene, dichlorostyrene, bromostyrene or copolymers of at least 50 percent by weight of one or more of such aromatic compounds and a minor proportion of another monoethylenically unsaturated organic compound copolymerizable therewith such as methyl methacrylate, acrylonitrile or alpha-methyl styrene, or polyolefins such as polyethylene, polypropylene, or ethylcellulose, poly(methyl methacrylate), or copolymers of a major proportion by weight of methyl methacrylate and a minor amount of a monovinyl aromatic compound, e.g. styrene.

It is important that the polymer be in powdered or granular form, i.e. in particles of sizes not appreciably greater than 12 mesh per inch as determined by U.S. Standard screens. In a preferred embodiment the thermoplastic polymer is in the form of particles of a mixture of sizes not greater than about 16 mesh, for example, 5 percent on a No. 16 mesh screen, about 70 percent on a No. 40 mesh screen and about 25 percent through a No. 40 mesh screen, or as fines.

Small amounts of additives such as antioxidants, pigments, dyes, colors, heat stabilizing agents, light stabilizing agents, flow agents, plasticizers, mold release agents and the like may also be incorporated with the polymer or with the dry blend of the polymer and the chopped strand fiberglass material, but such additives are not required in the invention. The additives, when used, are usually employed in amounts corresponding to form about 0.5 to 5 percent by weight of the polymer.

The following examples illustrate ways in which the principles of the invention has been applied, but are not to be construed as limiting its scope.

Example 1

A charge of 700 grams of a resinous copolymer of approximately 27 percent by weight acrylonitrile and 73 percent styrene, in the form of particles of sizes as determined by U.S. Standard screens as follows: through a No. 12 screen, on a No. 25 screen, 70 percent; through a No. 25 screen, on a No. 40 screen, 20 percent; through a No. 40 screen, 10 percent by weight, and having blended therewith 0.051 percent by weight of Nopcowax and 0.083 percent by weight of polyethylene glycol having an average molecular weight of 200, was placed in a one gallon wide mouth jar, together with 300 grams of chopped strand 1/4-inch long fiberglass. The mixture was blended by tumbling the same for a period of five minutes. Portions of the blended mixture were injection molded in a one ounce Watson Stillman Injection Molding Machine to form test pieces of 1/2 x 1/8 inch cross section. The molded test pieces had the fiberglass uniformly distributed throughout and had the properties:

| Fiberglass, percent | Molding temp., °F. | Room pressure, lbs./sq. in. | Tensile strength, lbs./sq. in. | Notched impact strength, ft.-lbs. |
|---|---|---|---|---|
| 30 | 600 | 125 | 11,700 | 4.79 |
| 30 | 475 | 900 | 13,116 | 2.70 |
| 30 | 475 | 250 | 11,434 | 3.13 |

Example 2

In each of a series of experiments, a copolymer of styrene and acrylonitrile in proportions similar to that of the copolymer used in Example 1, except that the copolymer was in the form of particles of sizes as determined by U.S. Standard screens as follows: on a No. 12 screen 0.2 percent; on a No. 25 screen 69.7 percent; on a No. 40 screen 20.1 percent; on a No. 80 screen 9.5 percent; fines 0.5 percent, was placed in a wide mouth glass jar and blended with 1/4-inch long chopped strand fiberglass in proportions as hereinafter stated by tumbling in the glass jar for a period of five minutes. Portions of the blended material were injection molded to form test bars. The compositions and the properties of the molded product were as follows:

| Fiberglass, percent | Molding temp., °F. | Room pressure, lbs./sq. in. | Tensile strength, lbs./sq. in. | Notched impact strength, ft.-lbs. |
|---|---|---|---|---|
| 10 | 500 | 1,000 | 10,100 | 0.53 |
| 40 | 500 | 1,000 | 8,600 | 0.72 |

In contrast, a blend of particles of the copolymer in the form of segments of rods of 1/8-inch diameter by 1/4-inch long and 40 percent by weight of the chopped strand fiberglass, prepared in the same manner, could not be injection molded.

Example 3

In each of a series of experiments, a copolymer of styrene and acrylonitrile in proportions similar to that of the copolymer used in Example 1, except that the copolymer was in the form of particles of sizes as determined by U.S. Standard screens as follows: on a No. 12 screen 0.2 percent; on a No. 25 screen 0.8 percent; on a No. 40 screen 30.2 percent; on a No. 80 screen 49.3 percent; fines 19.5 percent. The copolymer was blended with ¼-inch long chopped strand fiberglass by tumbling, was injection molded and was tested employing procedures similar to those employed in the preceding examples. The compositions and the properties of the molded product were as follows:

| Fiberglass, percent | Molding temp., °F. | Room pressure, lbs./sq. in. | Tensile strength, lbs./sq. in. | Notched impact strength, ft.-lbs. |
|---|---|---|---|---|
| 10 | 500 | 1,000 | 10,200 | 0.57 |
| 40 | 500 | 1,000 | 9,700 | 0.79 |

Example 4

In each of a series of experiments, a thermoplastic polymer as identified hereinafter and in the form of particles of sizes smaller than 20 mesh per inch as determined by U.S. Standard screens, was blended with ¼-inch long chopped strand fiberglass, in amount as hereinafter stated. Portions of the composition were injection molded and were tested employing procedures similar to those employed in the preceding examples. The compositions and the properties of the molded products were as follows:

| Polymer | | Fiberglass, Percent | Tensile strength, lbs./sq. in. | Impact strength, ft.-lbs. |
|---|---|---|---|---|
| Kind | Percent | | | |
| Polystyrene | 60 | 40 | 10,000 | 1.31 |
| 75% Styrene 25% α-Methylstyrene | 60 | 40 | 6,600 | 0.87 |
| Ethyl cellulose | 80 | 20 | 9,500 | 1.80 |
| Polyethylene | 80 | 20 | 5,300 | 2.36 |
| Do | 60 | 40 | 6,500 | 3.79 |

We claim:

1. In a process for making shaped articles from a composition comprising a major proportion by weight of a normally solid thermoplastic polymer and a minor amount of glass fibers, the improvement which consists in blending together from 60 to 95 parts by weight of a normally solid thermoplastic organic polymer in the form of particles of sizes not substantially greater than 12 mesh per inch as determined by U.S. Standard screens and from 40 to 5 percent by weight of chopped strand fiber glass in lengths between 3/16 and 9/16 inch, and thereafter molding said mixture of materials into shaped articles by injection molding techniques.

2. In a process for making shaped articles from a composition comprising a major proportion by weight of a normally solid thermoplastic polymer and a minor amount of glass fibers, the improvement which consists in blending together from 60 to 95 parts by weight of a normally solid thermoplastic organic polymer in the form of particles of sizes not substantially greater than 12 mesh per inch as determined by U.S. Standard screens and from 40 to 5 parts by weight of chopped strand fiber glass in lengths between 3/16 and 9/16 inch, and thereafter molding said mixture of materials into shaped articles by an extruding injection molding technique.

3. A process for making shaped articles of fiberglass reinforced thermoplastic polymers, which process comprises blending together from 60 to 95 parts by weight of a normally solid thermoplastic organic polymer in the form of particles of sizes not greater than 12 mesh per inch and consisting of about 95 percent of said polymer in the form of particles of sizes smaller than 16 mesh per inch as determined by U.S. Standard screens and from 40 to 5 percent by weight of chopped strand glass fibers in lengths between 3/16 and 9/16 inch, and thereafter molding said mixture materials into shaped articles by an extruding injection molding technique.

4. A process as claimed in claim 3 wherein the thermoplastic polymer is polystyrene.

5. A process as claimed in claim 3 wherein the chopped strand glass fibers are in lengths of approximately ¼-inch.

6. A process as claimed in claim 3 wherein approximately 70 parts by weight of polystyrene is blended with approximately 30 parts by weight of chopped strand glass fibers.

References Cited

UNITED STATES PATENTS 2,721,357 10/1955 Hochberg ———————— 260—41 X
2,936,487 5/1960 Paz ————————————— 260—41
3,072,581 1/1963 Platzer ————————— 260—41

OTHER REFERENCES

Sonneborn et al., Fiberglas Reinforced Plastics, Reinhold Publishing Co., New York, 1954, TA 455, P55 56, pp. 36, 37, 38 and 84.

MORRIS LIEBMAN, *Primary Examiner.*

J. H. DERRINGTON, *Assistant Examiner.*

UNITED STATES PATENT OFFICE

CERTIFICATE OF CORRECTION

Patent No. 3,396,142            August 6, 1968

Arthur George Little et al.

It is certified that error appears in the above identified patent and that said Letters Patent are hereby corrected as shown below:

Column 2, line 36, in the heading of the third vertical column in Example 1, "Room" should read -- Ram --; line 59, in the heading of the third vertical column in Example 2, "Room" should read -- Ram --. Column 3, line 12, in the heading of the third vertical column in Example 3, "Room" should read -- Ram --.

Signed and sealed this 6th day of January 1970.

(SEAL)
Attest:

Edward M. Fletcher, Jr.

Attesting Officer

WILLIAM E. SCHUYLER, JR.

Commissioner of Patents